United States Patent [19]

Goto

[11] Patent Number: 5,029,976

[45] Date of Patent: Jul. 9, 1991

[54] OPTICAL WAVELENGTH CONVERTER DEVICE AND OPTICAL WAVELENGTH CONVERTER MODULE

[75] Inventor: Chiaki Goto, Kanagawa, Japan

[73] Assignee: Fuji Photo Film Co., Ltd., Kanagawa, Japan

[21] Appl. No.: 423,325

[22] Filed: Oct. 18, 1989

[30] Foreign Application Priority Data

Oct. 19, 1988 [JP] Japan .................. 63-263317

[51] Int. Cl.$^5$ .............................................. G02F 1/35
[52] U.S. Cl. .................................. 350/96.29; 307/430; 350/96.15
[58] Field of Search ............................ 307/425–430; 250/227; 350/96.12, 96.13, 96.15, 96.20, 96.29, 96.30, 96.31, 96.32, 96.33, 96.34

[56] References Cited

U.S. PATENT DOCUMENTS

| 4,515,429 | 5/1985 | Smith et al. | 350/96.13 |
| 4,784,450 | 11/1988 | Jain et al. | 350/96.15 |
| 4,803,361 | 2/1989 | Aiki et al. | 250/227 |
| 4,874,221 | 10/1989 | Ohsawa | 350/96.29 |
| 4,907,850 | 3/1990 | Araki et al. | 350/96.13 |
| 4,919,511 | 4/1990 | Ohsawa | 350/96.29 |

FOREIGN PATENT DOCUMENTS 62-210432 9/1987 Japan .

OTHER PUBLICATIONS

Introduction to Optical Electronics, pp. 200–204, (written by A. Yariv and translated by K. Tada and T. Kamiya, published by Maruzen, K.K.).

Primary Examiner—John D. Lee
Attorney, Agent, or Firm—Sughrue, Mion, Zinn, Macpeak & Seas

[57] ABSTRACT

A fiber Cerenkov-type optical wavelength converter module includes an optical wavelength converter device comprising an optical fiber including a cladding having a first refractive index and a core of a nonlinear optical material disposed in the cladding, said core having a second refractive index higher than the first refractive index, whereby the optical fiber converts the wavelength of a fundamental wave introduced into the core and radiates a wavelength-converted wave into the cladding. A laser beam is emitted from a semiconductor laser and applied as the fundamental wave to the optical wavelength converter device. The temperature of the optical wavelength converter device, or the temperatures of the optical wavelength converter device and the semiconductor laser, are regulated such that the tolerances specified for the length of the optical fiber, the diameter of the core, and other dimensions can be increased. Therefore, the optical wavelength converter device and the optical wavelength converter module can be fabricated with greater ease.

15 Claims, 3 Drawing Sheets

F I G . 1
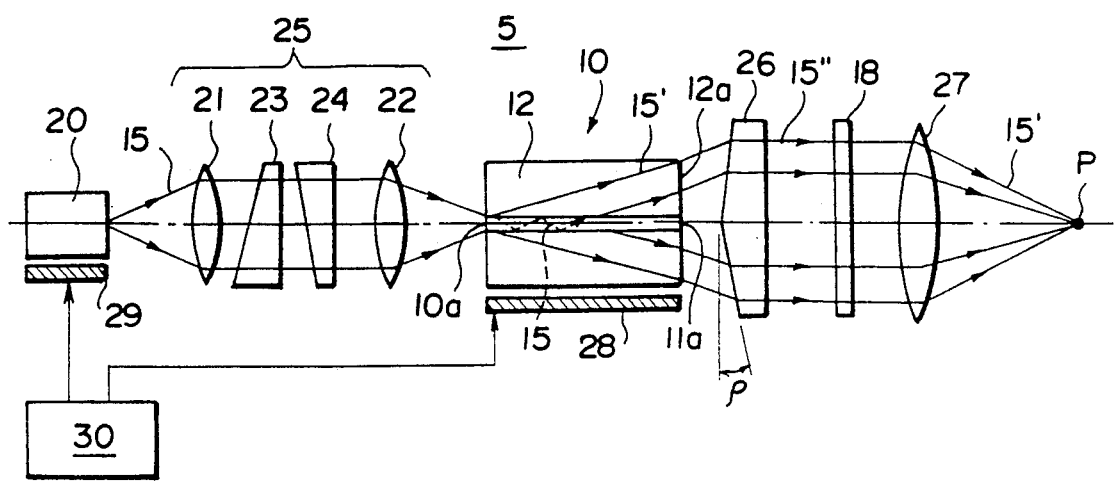
F I G . 2
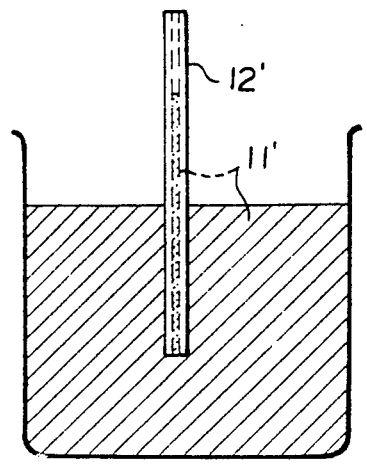

OPTICAL WAVELENGTH CONVERTER DEVICE AND OPTICAL WAVELENGTH CONVERTER MODULE

BACKGROUND OF THE INVENTION

1. Field of the Invention

The present invention relates to a fiber type optical wavelength converter device, which converts a fundamental wave into a second harmonic having a wavelength which is ½ of that of the fundamental wave, and an optical wavelength converter module employing such an optical wavelength converter device.

2. Description of the Prior Art

Various attempts have heretofore been made to convert the wavelength of a laser beam into a second harmonic, e.g., shortening the wavelength of a laser beam, or using a nonlinear optical material. One well known example of an optical wavelength converter device for effecting such laser wavelength conversion is a bulk crystal type converter device as disclosed, for example, in *Introduction to Optical Electronics,* pages 20~204, written by A. Yariv and translated by Kunio Tada and Takeshi Kamiya (published by Maruzen K.K.). This optical wavelength converter device relies upon the birefringence of a crystal in order to meet phase matching conditions. Therefore, any material which does not exhibit birefringence or exhibits only small birefringence cannot be employed, even if it has high nonlinearity.

To solve the above problem, there has been proposed a fiber-type optical wavelength converter device. An optical wavelength converter device of this type is in the form of an optical fiber comprising a core made of a nonlinear optical material and surrounded by a cladding. One example of such an optical fiber is shown in Vol. 3, No. 2, pages 2818 32, of the Bulletin of the Microoptics Research Group of a gathering of the Applied Physics Society. Recently, much effort has been directed to the study of a fiber-type optical wavelength converter device since it can easily achieve phase matching between a guided mode, in which a fundamental is guided through the core, and a radiated mode, in which a second harmonic is radiated into the cladding (for so-called Cerenkov radiation).

The wavelength-converted wave produced by the fiber-type optical wavelength converter device is emitted from the output end of the cladding and utilized in various applications. In many applications, the wavelength-converted wave is converged into a small spot. When a wavelength-converted wave is used to record optical signals, for example, the wavelength-converted wave is focused into a very small spot so that higher recording density can be achieved.

However, it has been recognized that the wavelength-converted wave emitted from the fiber Cerenkov-type optical wavelength converter device cannot be converged into a small spot even if the emitted wave is passed through a general spherical lens. In view of this drawback, the inventors of the present application have proposed an optical wavelength converter device capable of converging a wavelength-converted wave into a small spot and an optical wavelength converter module employing such an optical wavelength converter device (see U.S. patent application Ser. No. 384,532). The proposed optical wavelength converter device comprises a fiber Cerenkov-type optical wavelength converter device which includes a cladding having an exit end for emitting a wavelength-converted wave. The exit end of the cladding may have a conical shape for converting the conical wavefront of the wavelength converted wave into a plane wavefront; alternatively it may be shaped like an aspherical lens for converting the conical wavefront into a spherical wavefront, or it may support a grating composed of concentric patterns for converting the conical wavefront into a plane or spherical wavefront.

The proposed optical wavelength converter module comprises a fiber Cerenkov optical wavelength converter device of the type described above and an optical device disposed such that it receives a wavelength-converted wave emitted from the exit end of the cladding of the optical wavelength converter device and converts the conical wavefront of the received wavelength-converted wave into a plane or spherical wavefront.

If the wavefront of a wavelength-converted wave can be converted into a plane wavefront by the above optical device, by a conically-shaped exit end of the cladding, or by a concentric pattern grating on the exit end of the cladding, then the wavelength-converted wave can be focused into a small spot by being passed through an ordinary spherical lens.

If the wavefront of a wavelength-converted wave can be converted into a convergent spherical wavefront by the above optical device, by an exit end of the cladding shaped like an aspherical lens, or by a concentric pattern grating on the exit end of the cladding, then the wavelength-converted wave can be focused into a small spot. Even if the wavefront of a wavelength-converted wave is converged into a divergent spherical wavefront, the wavelength-converted wave can be focused into a small spot by being passed through an ordinary spherical lens.

In order for the wavelength-converted wave to focus well, the length of the fiber, the diameter of the core, and the distance between the optical wavelength converter device and the optical device must be strictly set to certain values corresponding to the wavelength of the fundamental. Therefore, when the optical wavelength converter devices and the optical wavelength converter modules are fabricated, the tolerances for the fiber length, the core diameter, and other dimensions are very small. Therefore, optical wavelength converter devices and modules of the above type are manufactured with a low yield and hence are expensive. When an optical wavelength converter device or module is employed, the light source, such as a semiconductor laser used in combination therewith as a fundamental wave generator, should not produce large variations or fluctuations in the wavelength. Consequently, a system which employs the optical wavelength converter device or module is also expensive.

With the present optical fiber fabricating technology, it is highly difficult or even impossible to produce a core, for example, such that any error in its diameter will be held within the specified limited tolerance.

There are certain instances in applications which do not involve wavefront conversion as described above where the tolerances specified for the length of a fiber, the diameter of a core, and other dimensions are also extremely small. In such cases, the optical wavelength converter device or module is costly or even impossible to fabricate due to limits in the capabilities of the fabricating technology.

SUMMARY OF THE INVENTION

In view of the aforesaid drawbacks of conventional optical wavelength converter devices and modules, it is an object of the present invention to provide an optical wavelength converter device of the fiber Cerenkov-type which allows larger tolerances to be specified for the length of a fiber, the diameter of a core, and other dimensions, and an optical wavelength converter module employing such an optical wavelength converter device.

According to the present invention, there is provided a fiber Cerenkov optical wavelength converter device comprising an optical fiber including a cladding having a first refractive index and a core of a nonlinear optical material disposed in the cladding, said core having a second refractive index higher than the first refractive index, whereby the optical fiber converts the wavelength of a fundamental wave introduced into the core and radiates a wavelength-converted wave into the cladding, and means for regulating the temperature of the optical fiber.

According to the present invention, there is also provided an optical wavelength converter module comprising a fiber Cerenkov-type optical wavelength converter device comprising an optical fiber including a cladding having a first refractive index and a core of a nonlinear optical material disposed in the cladding, said core having a second refractive index higher than the first refractive index, whereby the optical fiber converts the wavelength of a fundamental wave introduced into the core and radiates a wavelength-converted wave into the cladding, a semiconductor laser for generating a laser beam to be applied as the fundamental wave to the optical wavelength converter device, and means for regulating the temperature of the optical wavelength converter device and/or the semiconductor laser.

When the temperature of the optical wavelength converter device varies, the refractive indexes of the core and the cladding vary, and hence the phase matching angle also varies. Optimum values for dimensions such as the length of the optical fiber, the diameter of the core, etc., which allow the wavelength-converted wave to be focused into a small spot, vary depending on the phase matching angle. These dimensions can thus be made to have the exact values or almost the exact values which are required for the wavelength-converted wave to focus well, by varying the temperature of the optical wavelength converter device and thereby varying the phase matching angle. If the wavelength of the laser beam emitted from the semiconductor laser deviates from a desired wavelength, then the phase matching angle also varies from a desired angle, resulting in changes in the optimum dimensional values. However, such a deviation in the wavelength can be compensated for by varying the phase matching angle in the manner described above.

The wavelength of the laser beam emitted from the semiconductor laser can also be varied by varying the temperature of the semiconductor laser. When the wavelength of the laser beam, i.e., the fundamental wave applied to the optical wavelength converter device varies, the phase matching angle also varies. Therefore, the foregoing dimensions can be made to have the exact values or almost the exact values required for the wavelength-converted wave to focus well by varying the temperature of the semiconductor laser.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a schematic side elevational view of an optical wavelength converter module according to a first embodiment of the present invention;

FIG. 2 is a schematic view showing a process for manufacturing an optical wavelength converter device, which device is employed in the optical wavelength converter module shown in FIG. 1;

DESCRIPTION OF THE PREFERRED EMBODIMENTS

Figure 3:
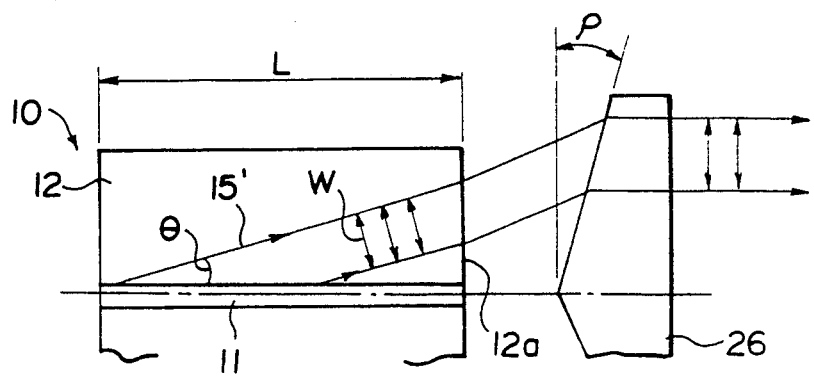
FIG. 3 is an enlarged fragmentary side elevational view of the optical wavelength converter device.

Identical parts are denoted by identical reference numerals throughout the drawings.

FIG. 1 shows an optical wavelength converter module 5 according to a first embodiment of the present invention. The optical wavelength converter module 5 comprises an optical wavelength converter device 10, a semiconductor laser 20 for emitting a fundamental wave 15, the wavelength of which is to be converted by the optical wavelength converter device 10, an input optical system 25 comprising two convex lenses 21, 22 and beam shaper prisms 23, 24, the lens 21 serving as a collimator lens and the lens 22 as an objective lens, a conical lens 26, a condenser lens 27, two temperature regulating devices 28, 29 comprising Peltier elements and disposed near the optical wavelength converter device 10 and the semiconductor laser 20, respectively, and a driver circuit 30 for driving the temperature regulating devices 28, 29.

The optical wavelength converter device 10 comprises an optical fiber including a core 11 made of a nonlinear optical material and filled into a hollow space defined centrally in a cladding 12. The nonlinear optical material of the core 11 is preferably an organic nonlinear optical material having a high wavelength conversion efficiency. In this embodiment, the core 11 is made of 3,5-dimethyl-1-(4-nitrophenyl)pyrazole (hereinafter referred to as "PRA"), as disclosed in Japanese Unexamined Patent Publication No. 62(1987)-210432.

A process for manufacturing the optical wavelength converter device 10 will be described below with reference to FIG. 2. It is assumed that the core 11 is made of PRA and the cladding 12 is made of SF56 glass. A hollow glass fiber 12' serves as the cladding 12, the hollow glass fiber 12' having an outside diameter of about 5.2 mm and the hollow space therein having a diameter of about 1.5 $\mu$m, for example. As shown in FIG. 2, PRA is kept as a molten solution 11' in a furnace, and one end of the glass fiber 12' is immersed in the molten solution 11'. Then, the molten solution 11' of PRA enters the hollow space in the glass fiber 12' due to capillarity. The molten solution 11' is kept at a temperature slightly higher than the melting point (102° C.) of PRA in order to prevent the PRA from being decomposed. Thereafter, the glass fiber 12' is quickly cooled, which causes the PRA in the hollow space to be polycrystallized.

Then, the glass fiber 12' is gradually pulled from the furnace, which is kept at a temperature (e.g., (102.5° C.) higher than the melting point of PRA, into an outer space, which is kept at a temperature lower than that melting point, thereby causing the molten PRA to be monocrystallized continuously at the point where it is progressively withdrawn from the furnace. The core 11 thus prepared is of a highly long monocrystalline form with a uniform crystal orientation. The optical wavelength converter device 10 is therefore sufficiently long.

After the core 11 is filled into the glass fiber 12', the opposite ends of the glass fiber 12' are cut off at suitable points. In this manner, the optical wavelength converter device 10 shown in FIGS. 1 and 3 is produced.

A fundamental wave is applied to the optical wavelength converter device 10 as shown in FIG. 1. More specifically, a laser beam (fundamental wave) 15, which is emitted as a divergent beam from the semiconductor laser 20 and has a wavelength of 890 nm, is converted by the collimator lens 21 into a parallel beam whose cross section is then shaped into a circular shape by beam shaper prisms 23, 24. The laser beam 15 is then converged by the objective lens 22 and applied to the entrance end 10a (the end of the core 11) of the optical wavelength converter device 10. The laser beam 15 now enters the core 11. The laser beam or fundamental wave 15 is then converted by the PRA of the core 11 into a second harmonic 15' whose wavelength is ½ of the wavelength of the fundamental wave 15. The second harmonic 15' is radiated into the cladding 12 and travels through the device 10 toward the opposite exit end thereof. Phase matching is achieved between a guided mode in which the fundamental wave 15 is guided through the core 11 and a radiated mode in which the second harmonic 15' is radiated into the cladding 12 (Cerenkov radiation).

The second harmonic 15' is emitted out of the device 10 from the end 12a of the cladding 12. The fundamental wave 15, which has been guided through the core 11, is emitted from the end 11a of the core 11. A light beam 15'' containing the second harmonic 15' and the fundamental wave 15 then goes through the filter 18, which passes only the second harmonic 15'. Therefore, only the second harmonic 15' is extracted by the filter 18. The second harmonic 15' then passes through the condenser lens 27, which has the form of a general spherical lens and which focuses the second harmonic 15' into a small beam spot P. FIG. 1 does not show any device which utilizes the second harmonic 15'. However, such devices usually utilize the focused spot of the second harmonic 15'.

Operation of the conical lens 26 will hereinafter be described in detail. In this embodiment, as shown in FIG. 3, the cladding 12 is thick enough for the second harmonic 15' radiated into the cladding 12 at a phase matching angle $\theta$ to be emitted out of the device 10 directly from the cladding end 12a without being totally reflected by the outer surface of the cladding 12. To achieve this, the diameter D of the cladding 12 should be selected such that it meets the condition:

$$D > 2L \cdot \tan \theta + d \quad (1)$$

where d is the diameter of the core 11 and L is the length of the optical wavelength converter device 10 (see FIG. 3). With such dimensional limitations, the wavefront of the second harmonic 15' traveling through the cladding 12 is oriented as indicated by the arrows W in FIG. 3 in one plane including the core axis. Therefore, the wavefront has a conical shape as a whole. The second harmonic 15' emitted from the cladding 12 then passes through the conical lens 26, whereupon the second harmonic 15' has a plane wavefront. Therefore, the second harmonic 15' can be focused into a small spot P by being passed through the condenser lens 27, which comprises a spherical lens. The configuration of the conical lens 26 is described in detail in U.S. patent application Ser. No. 384,532.

The temperature regulating devices 28, 29 operate as follows: In this embodiment, the wavelength of the fundamental 15 is 890 nm, the core 11 is made of PRA, the diameter of the core 11 is 1.5 $\mu$m, the cladding 12 is made of SF56 glass, the diameter of the cladding 12 is 5.2 mm, the phase matching angle $\theta$ is 14.42°, and the length L of the device 10 is 10 mm. (These numerical values satisfy equation (1) above). The conical lens 26 is made of SF10 glass and the gradient $\rho$ of the conical surface thereof is 27.60°. In order for the second harmonic 15' to be focused into a sufficiently small spot P, it is necessary that the angular difference $\Delta\theta$ between the direction of the parallel beam emitted from the conical lens 26 and the optical axis be $\Delta\theta \leq 0.006°$, as is apparent if the appropriate calculations are carried out. The tolerance for the diameter of the core 11 is calculated as $\pm 0.006$ $\mu$m from the above calculated angular difference. However, from a practical point of view it is difficult to fabricate the optical wavelength converter device 10 such that any error in the diameter of the core 11 will be held within the above tolerance.

According to the present invention, the temperature regulating devices 28, 29 are driven by the driver circuit 30, which regulates the temperatures of the optical wavelength converter device 10 and the semiconductor laser 20 in a range of $\pm 5°$ C. It is now assumed that the rate of change of the wavelength of the laser beam generated by the semiconductor laser 20 is 0.27 nm/°C. (the average of mode hoppings and changes within modes), the rate of change of the refractive index of the PRA of the core 11 is about $-9 \times 10^{-5}$/nm and about $-1 \times 10^{-4}$/°C., and the rate of change of the refractive index of the SF56 glass of the cladding 12 is about $10 \times 10^{-6}$/°C. Then, the temperatures of the optical wavelength converter device 10 and the semiconductor laser 20 can be regulated so that the phase matching angle varies such that $\Delta\theta = \pm 0.06°$. Therefore, the tolerance for the diameter of the core 11 becomes $\pm 0.06$ $\mu$m, which is ten times the calculated tolerance referred to above. As a result, the optical wavelength converter device 10 can easily be fabricated.

Figure 4:
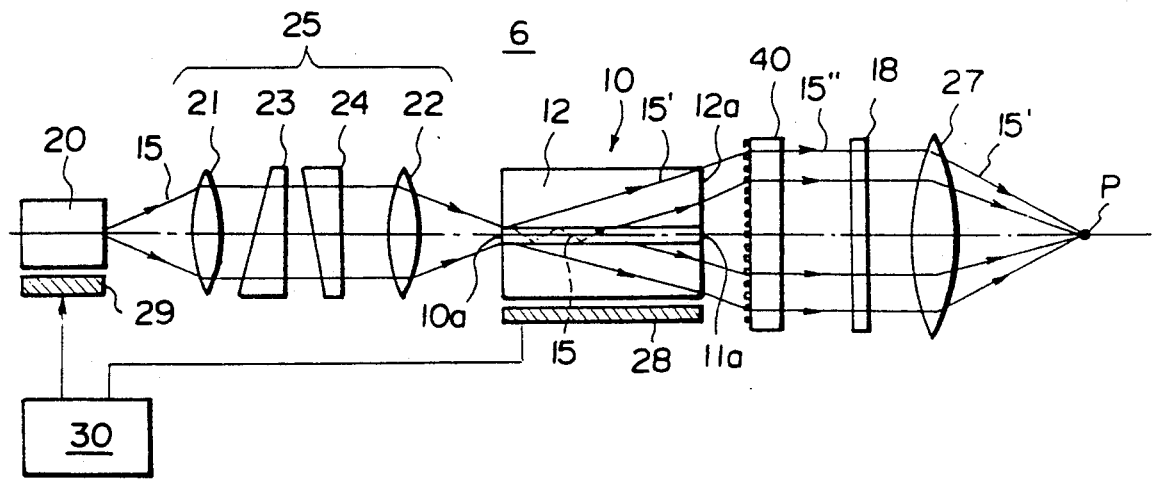
FIGS. 4 and 5 are schematic side elevational views of optical wavelength converter modules according to second and third embodiments of the present invention.

An optical wavelength converter module 6 according to a second embodiment of the present invention will now be described with reference to FIG. 4. The optical wavelength converter module 6 differs from the optical wavelength converter module 5 shown in FIG. 1 in that the conical lens 26 shown in FIG. 1 is replaced with a lens 40 which supports a grating of concentric patterns at equal pitches. The lens 40 with such a grating can effect the same wavefront converting effect as the conical lens 26. The lens 40 with a concentric pattern grating is also disclosed in detail in U.S. patent application Ser. No. 384,532.

If the temperatures of the optical wavelength converter device 10 and the semiconductor laser 20 were not regulated, the tolerance for the core diameter would be ±0.004 μm at $\Delta\theta \leq 0.006°$. However, if the temperatures of the optical wavelength converter device 10 and the semiconductor laser 20 are regulated in the range of ±5° C. as in the first embodiment, angular difference of $\Delta\theta = \pm 0.14°$ can be achieved. Therefore, the tolerance for the core diameter is increased about 23 times (0.14°/0.006°) and becomes ±0.004 μm×23 = ±0.09 μm. When the tolerance specified for the core diameter is sufficiently large, the tolerances for other dimensions, such as the length L of the optical wavelength converter device 10, can also be increased, and the accuracy of other conditions, such as the wavelength of the beam generated by the semiconductor laser 20, can be kept to less strict standards. As a result, the optical wavelength converter module 6 can be fabricated with ease.

Figure 5:
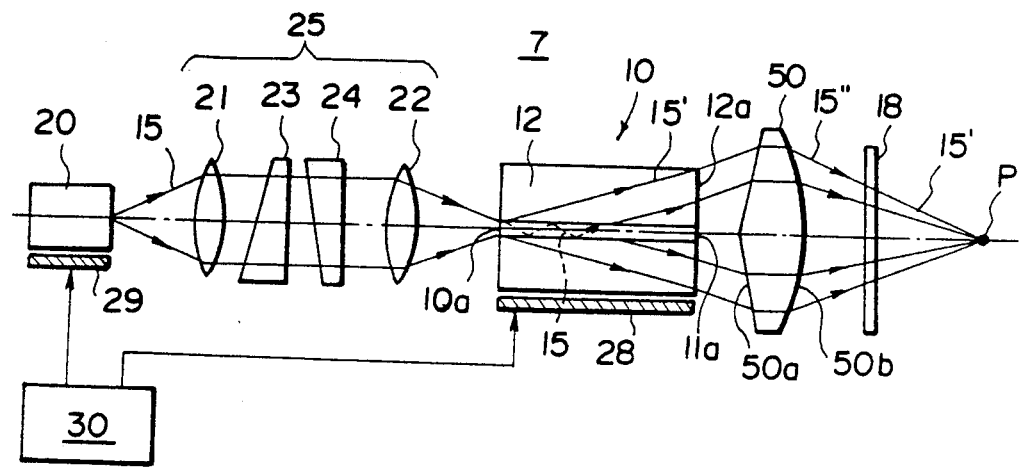

FIG. 5 shows an optical wavelength converter module 7 according to a third embodiment of the present invention. The optical wavelength converter module 7 differs from the optical wavelength converter module 5 shown in FIG. 1 in that the conical lens 26 shown in FIG. 1 is replaced with a lens 50 having a conical surface 50a which faces the optical wavelength converter device 10 and a spherical surface 50b which faces the filter 18, and the lens 27 shown in FIG. 1 is dispensed with.

When the second harmonic 15' emitted from the optical wavelength converter device 10 passes through the conical lens surface 50a, the conical wavefront of the second harmonic 15' is converted into a plane wavefront. When the second harmonic 15' further passes through the spherical lens surface 50b, the plane wavefront thereof is converted into a convergent spherical wavefront, so that the second harmonic 15' is focused into a small spot P.

The optical wavelength converter module 7 offers the same advantages as those described above. By driving the temperature regulating devices 28, 29 with the driver circuit 30, the optical wavelength converter module 7 regulates the temperatures of the optical wavelength converter device 10 and the semiconductor laser 20.

Figure 6:
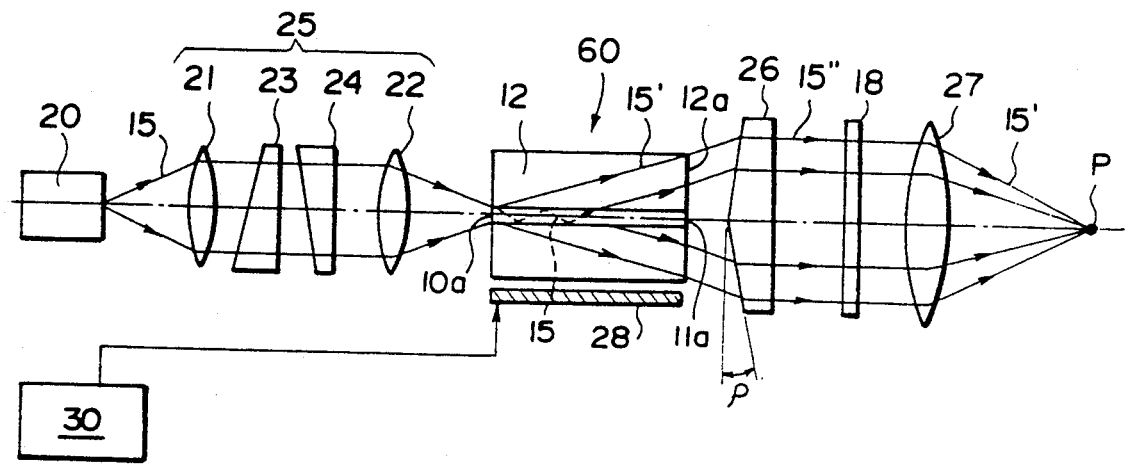
FIG. 6 is a schematic side elevational view of an optical wavelength converter device according to a fourth embodiment of the present invention.

According to a fourth embodiment of the present invention shown in FIG. 6, only the temperature of an optical wavelength converter device 60 is regulated by the temperature regulating device 28 controlled by the driver circuit 30. Even if only the temperature of the optical wavelength converter device 60 is regulated, the phase matching angle can be made to vary so that the tolerance specified for the length of the optical wavelength converter device 60 will increase and greater fluctuation will be allowed in the wavelength of the laser beam emitted from the semiconductor laser 20.

With the present invention, as described above, the temperature of the optical wavelength converter device or the temperatures of the optical wavelength converter device and the semiconductor laser are regulated, which thereby increases the tolerances for the length of the optical fiber, the diameter of the core, and other dimensions. As a result, the fiber Cerenkov-type optical wavelength converter device and the optical wavelength converter module which employs the same can be easily fabricated at a reduced cost.

Although certain preferred embodiments have been shown and described, it should be understood that many changes and modifications may be made herein without departing from the scope of the appended claims.

I claim:

1. An optical wavelength converter device comprising:
   (i) an optical fiber including a cladding having a first refractive index and a core of a nonlinear optical material surrounded by said cladding, said core having a second refractive index higher than said first refractive index, whereby said optical fiber converts the wavelength of a fundamental wave introduced into said core and radiates a wavelength-converted wave into said cladding; and
   (ii) means for regulating the temperature of said optical fiber.

2. An optical wavelength converter device according to claim 1, wherein said temperature regulating means comprises a temperature regulating device disposed near said optical fiber and a driver circuit for driving said temperature regulating device.

3. An optical wavelength converter device according to claim 2, wherein said temperature regulating device comprises a Peltier element.

4. An optical wavelength converter device as defined in claim 1, wherein said means for regulating the temperature of said optical fiber regulates heat applied to said optical fiber.

5. An optical wavelength converter module comprising:
   (i) an optical wavelength converter device comprising an optical fiber including a cladding having a first refractive index and a core of a nonlinear optical material surrounded by said cladding, said core having a second refractive index higher than said first refractive index, whereby said optical fiber converts the wavelength of a fundamental wave introduced into said core and radiates a wavelength-converted wave into said cladding;
   (ii) a semiconductor laser for generating a laser beam to be applied as said fundamental wave to said optical wavelength converter device; and
   (iii) means for regulating the temperature of said optical wavelength converter device and/or said semiconductor laser.

6. An optical wavelength converter module according to claim 5, wherein said temperature regulating means comprises a temperature regulating device disposed near said optical wavelength converter device and a driver circuit for driving said temperature regulating device.

7. An optical wavelength converter module according to claim 5, wherein said temperature regulating means comprises two temperature regulating devices disposed near said optical wavelength converter device and said semiconductor laser, respectively, and a driver circuit for driving said temperature regulating devices.

8. An optical wavelength converter module according to claim 6 or 7, wherein each said temperature regulating device comprises a Peltier element.

9. An optical wavelength converter module as defined in claim 5, wherein said means for regulating the temperature of said optical wavelength converter device and/or said semiconductor laser regulates heat applied to said optical wavelength converter device and/or said semiconductor laser, respectively.

10. A method of converting an optical wavelength for use with an optical wavelength converter device comprising an optical fiber including a cladding having a first refractive index and a core of a nonlinear optical material surrounded by said cladding, said core having a second refractive index higher than said first refractive index, and means for regulating the temperature of said optical fiber, said method comprising the steps of:

applying a wave into said core of said optical fiber;

regulating a temperature of said optical fiber;

converting a wavelength of said wave applied into said core of said optical fiber; and radiating said wave, which has been wavelength-converted, from said core through said cladding.

11. A method as defined in claim 10, wherein said regulating step includes regulating the heat applied to said optical fiber.

12. A method as defined in claim 11, wherein said regulating step varies a phase matching angle of said wave radiated through said cladding.

13. A method of converting an optical wavelength for use with an optical wavelength converter module comprising an optical wavelength converter device which comprises an optical fiber including a cladding having a first refractive index and a core of a nonlinear optical material surrounded by said cladding, said core having a second refractive index higher than said first refractive index, a semiconductor laser, and means for regulating the temperature of said optical wavelength converter device and/or said semiconductor laser, said method comprising the steps of:

generating a laser beam to be applied as a wave to said optical wavelength converter device;

applying said wave into said core of said optical fiber of said optical wavelength converter device;

regulating a temperature of said optical wavelength converter device and/or said semiconductor laser;

converting a wavelength of said wave applied into said core of said optical fiber of said optical wavelength converter device; and radiating said wave, which has been wavelength-converted, from said core through said cladding.

14. A method as defined in claim 13, wherein said regulating step includes regulating the heat applied to said optical wavelength converter device and/or said semiconductor laser.

15. A method as defined in claim 13, wherein said regulating step varies a phase matching angle of said wave radiated through said cladding.

* * * * *